Nov. 14, 1961   J. A. BOMBARDIER   3,008,731
TREE HOLDING MEANS FOR MOTOR VEHICLES
Filed Dec. 9, 1960

INVENTOR
Joseph Armand BOMBARDIER
By
Agent

United States Patent Office 3,008,731
Patented Nov. 14, 1961

3,008,731
TREE HOLDING MEANS FOR MOTOR VEHICLES
Joseph Armand Bombardier, Valcourt, Shefford County, Quebec, Canada
Filed Dec. 9, 1960, Ser. No. 74,946
Claims priority, application Canada Dec. 12, 1959
11 Claims. (Cl. 280—179)

The present invention relates to means for transporting trees, and more particularly to a mechanism for holding trees on a motor vehicle, and more specifically on an endless track vehicle.

The general object of the present invention resides in the provision of means for transporting whole trees with their branches over rough ground, such as in the forest.

A more specific object of the present invention resides in the provision of a mechanism for holding whole trees on a vehicle which can hold several trees side by side in a flexible manner and with sufficient holding power for pulling the trees which trail rearwardly of the vehicle; this mechanism allowing the vehicle to turn and take an inclined position with respect to the trees.

Another important object of the present invention resides in a mechanism of the character described mounted on a vehicle and adapted to automatically receive the trees which are cut and loaded by a mechanism mounted on the same vehicle.

Yet another important object of the present invention resides in the provision of a holding mechanism of the character described which can clamp on the vehicle only one tree as well as two or more.

The foregoing and other important objects of the present invention will become more apparent during the following disclosure and by referring to the drawings, in which.

In the annexed drawings, the same reference characters indicate the same elements throughout.

Figure 1:
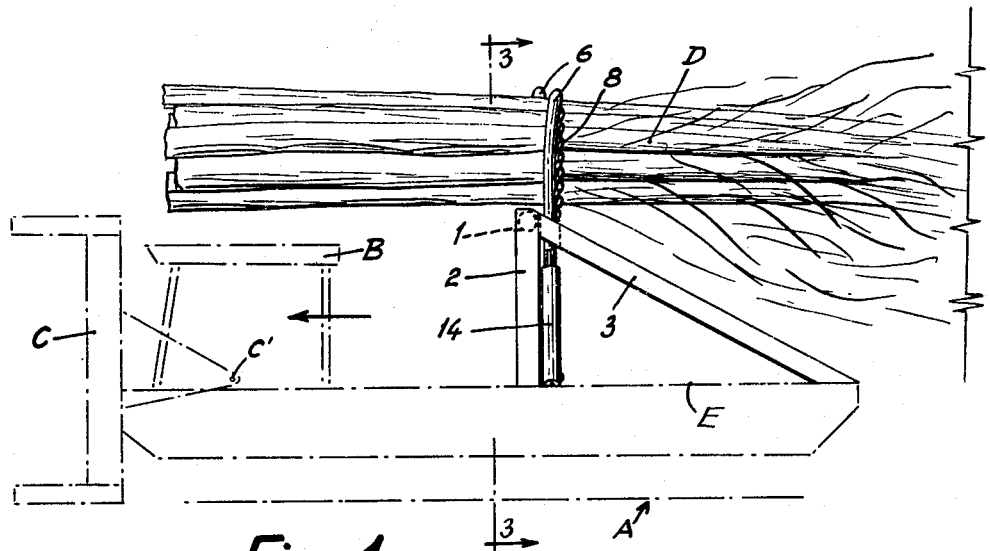
FIGURE 1 is a side elevation of the mechanism in accordance with the invention mounted on an endless track vehicle shown in dot and dash line, and showing how the trees are held on the vehicle.

Reference letter A indicates a vehicle, and more particularly, a tractor provided with endless tracks and capable of travelling over rough ground, such as in forest. The endless track vehicle A is provided at the front thereof with a protecting roof B for the driver, under which are located a driver's seat and controls for the vehicle and the handling mechanisms.

A mechanism generally indicated at C is disposed in front of the vehicle and is pivotally mounted at C' for pivotal movement in a vertical plane over the roof B; the mechanism C is described in a Canadian patent application of the same inventor entitled: "Mechanism for Cutting and Loading Trees on a Vehicle," Serial No. 788,601, filed December 15, 1959. Mechanism C has jaws at the upper and lower ends for encircling and clamping the tree while being cut by a power saw mounted at the lower end of the device. The mechanism further includes means for pivoting the clamped tree and mechanism C about point C' so as to tilt the tree into horizontal position over the back of the vehicle.

The mechanism in accordance with the present invention serves to hold and retain the felled trees on the endless track vehicle A while the vehicle A pulls the trees to finally reach a location in the forest where the trees are pruned and cut into logs by a machine which is described and claimed in co-pending U.S. patent applications of the same inventor Serial No. 56,404, filed September 16, 1960, and entitled "Machine for Pruning and Cutting Trees into Logs," and Serial No. 45,375, filed July 26, 1960, and entitled: "Tree Pruning Jaws," now Patent No. 2,989,097.

In accordance with the present invention, a transverse horizontally disposed elongated member 1 is secured over the middle part of the vehicle A by means of uprights 2 which are reinforced by stays or diagonal braces 3 downwardly inclined towards the rear end of the vehicle and connecting the upper ends of the uprights 2 to the back part of the chassis E of the vehicle A. The transverse member 1 is preferably of circular cross section and is disposed at a level slightly above the roof B.

A rearwardly downwardly inclined apron 4 is secured to and supported by braces 3 and simply consists of a heavy gauge metal plate coextensive with braces 3 and with the back of the endless track chassis E and terminating at the front edge thereof short of the transverse member 1 so as to define with the latter a transverse elongated slot 5.

A pair of curved arms 6 are vertically disposed adjacent to and behind transverse member 1 and extends through slot 5 and below as well as above member 1.

Figure 2:
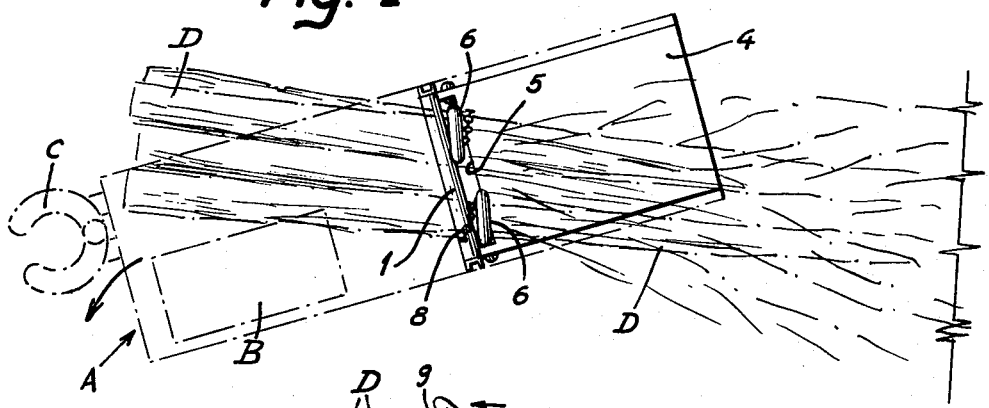
FIGURE 2 is a schematic top plan view.

The lower end of each arm 6 is pivoted at 7 to a support rigidly secured to chassis E of the vehicle in such a manner that arms 6 can pivot in a vertical plane transverse to the long axis of the vehicle between an open limit position in which each arm abuts against the respective brace 3 at the outer ends of slot 5 and a closed position in which the two arms cross each other, the upper portion of said arms being slightly inclined towards the front and the back, as shown in FIGURE 2, in order to permit this crossing.

Flexible elements are disposed between the two ends of each arm 6. In accordance with the invention, each flexible element consists of a flexible chain 8 secured at 9 to the upper end of the arm 6 and having its other end attached to one end of a coil spring, the other end of which attached to the free end of a lateral extension 11 secured to the lower portion of arm 6; the coil spring (not shown) is protected by a sleeve 12. The coil spring pulls on the chain with a considerable force so as to keep the latter taut, but permits the chain to take a position in close proximity with the curved arm 6.

Each curved arm 6 is preferably provided with a plurality of teeth 13 spaced longitudinally on the inside surface of the upper portion of the arm, above transverse member 1.

Each arm 6 is pivoted about pivot 7 by means of a hydraulic cylinder and piston unit 14, the upper end of which is pivoted at 15 to arm 6 just below transverse member 1 and the lower end of which is pivoted to the chassis E of the vehicle, as shown at 16, adjacent the lower end of upright 2.

Figure 3:
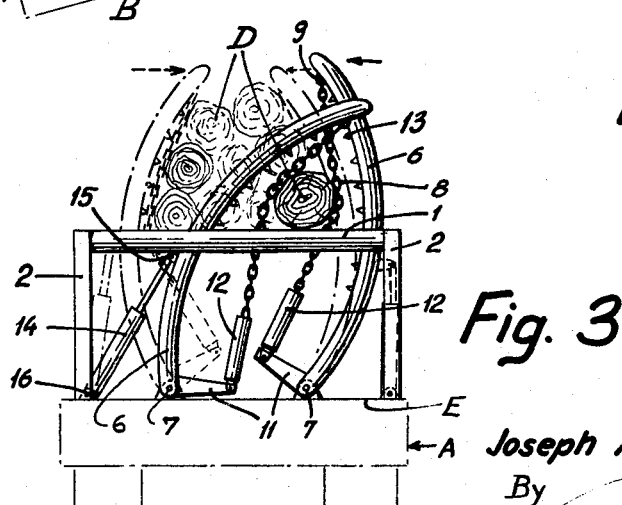
FIGURE 3 is a front elevation of the mechanism mounted on the vehicle, itself illustrated in dot and dash line.

These cylinders and piston units 14 are fed with hydraulic fluid under pressure and controlled by the driver of the endless track vehicle by known means (not shown). The mechanism in accordance with the present invention functions as follows:

The two curved arms 6 are actuated to take their outer open limit position wherein with each arm has the position shown in full line by arm 6 on the right hand side of FIGURE 3. In this position, there is sufficient space between the two chains 8 and above the transverse member 1 for receiving the trunk D of a tree which is loaded by mechanism C onto transverse member 1 such that the major part of the tree trails behind the vehicle. The tree trunk D is held or clamped in position on top of member 1 by closing one of the arms 6 for instance the left hand arm 6, as shown in FIGURE 3, which is pivoted inwardly across the other arm under action of its cylinder and piston unit 14. The pressure exerted by unit 14 on the closed arm is sufficient for the two chains 8 to elongate and take a curved position partly surrounding the tree trunk D, the coil spring in sleeve 12 coming under tension and extending slightly under lateral pressure exerted by the arm 6. Thus, the tree trunk is tightly held on member 1 but can nevertheless pivot in a vertical as well as in a horizontal plane with respect to the vehicle it being understood that the tree B being a whole tree will extend for a substantial distance behind the endless track vehicle for instance from 50 to 75 feet, all the top of the tree resting on the ground. Thus, when the vehicle makes a turn, as shown in FIGURE 2, the chains 8 which are only retained at their two ends can take a laterally offset position with respect to the vertical plane containing the curved arms 6.

The arms 6 together with the chains 8 can retain a plurality of tree trunks, for example up to ten, this number varying depending on the diameter of the tree trunks and of the dimensions of the device in accordance with the present invention.

The chains 8 constitute flexible elements which conform to the stack of tree trunks supported on member 1. Teeth 13 dig into the tree trunks at the exterior of the stack when the chains 8 are sufficiently elongated to conform to the curvature of the curved arm 6 as illustrated in dotted line in FIGURE 3. However, teeth 13 are not essential, because chains 8 are generally enough to tightly hold the trees in position provided the coil springs in sleeves 12 have sufficient strength for exerting the necessary pulling force. It is to be noted that arms 6 can open and close for receiving and retaining the trees one by one and successively during the cutting and loading operation of successive trees in the forest. During this cutting and loading operation, each tree is successively clamped by mechanism C and cut at the base thereof and then the mechanism C is pivoted about pivot point C' in order to tilt the tree rearwardly with respect to the vehicle and to load the tree over the transverse member 1, such that the cut end of the tree trunk is approximately alined with the front of the cab roof B. In this nearly horizontal position, the major part of the tree trails on the ground behind the endless track vehicle. In FIGURES 1 and 2, only part of the trees are shown due to lack of space. Thus, the trees are successively cut and loaded onto the vehicle A and the arms 6 retain and clamp the cut trees during cutting and loading of additional trees. When the vehicle has a full load of trees, it pulls the same to the pruning and cutting site.

It is to be noted that although the two arms 6 are being shown as pivotally mounted at 7 on the vehicle A, it is possible to have one arm rigid with the vehicle, thereby eliminating one hydraulic cylinder and piston unit 14. Under these conditions, the right hand arm of FIGURE 3 will be fixed to the vehicle while the left hand arm will be pivotally mounted, that is the arm 6 which is directly behind the cutting and loading mechanism C.

When the tractor has transported the trees to the pruning and cutting site, the arms 6 are opened and the vehicle continues its forward movement whereby the tree trunks simply slide on transverse member 1 and down the inclined apron 4. The vehicle is then free of the trees and can return to the forest for cutting additional trees and bring back the same for pruning and cutting into logs.

While a preferred embodiment in accordance with the present invention has been illustrated and described, it is understood that various modifications may be resorted to without departing from the spirit and scope of the appended claims.

What I claim is:
1. Means for holding trees on a vehicle comprising a transverse member secured to and above said vehicle and on which the tree trunks of a plurality of trees can rest, a pair of flexible elements disposed in a vertical plane adjacent said transverse member and extending above and below said transverse member, arms mounted on said vehicle, the ends of said flexible elements being resiliently connected to said arms and maintained in taut condition, and power means for moving at least one of said arms in a transverse vertical plane with respect to said vehicle, in order to move the flexible element connected to said one arm in a transversal movement with respect to said vehicle between an opened position spaced from the other flexible element and a close position crossing said other flexible element.

2. A holding device as claimed in claim 1, wherein said flexible elements include spring means for resiliently maintaining said elements in taut condition.

3. A device as claimed in claim 1, wherein said flexible elements consist of chains directly attached at one end to the outer end of said arms and at the other end to a spring itself attached to the other end of the arms.

4. A device for holding trees on a vehicle comprising a transverse horizontal member secured to said vehicle and on which a plurality of tree trunks can rest, a pair of curved arms mounted in a vertical plane adjacent said transverse member and extending above and below said transverse member, flexible elements resiliently connected between the ends of each curved arm and maintained in taut condition, at least one of said curved arms being pivoted to said vehicle at its lower end in order to pivot in said vertical plane between an open position spaced from the other arm in order to dispose tree trunks onto said transverse member between said two flexible elements, and a closed position in which said flexible elements tightly embrace said tree trunks and power means for pivoting said pivotable arm towards said other arm and cause said flexible elements to tightly hold the tree trunks and retain the same onto said transverse member, while allowing turning and inclining movement of said vehicle with respect to said trees.

5. A device as claimed in claim 4, wherein said flexible elements consists of chains directly attached at one end to the outer end of said arms and at the other end to a spring itself attached to the other end of the arms.

6. A device as claimed in claim 4, wherein said curved arms are inclined forwardly and rearwardly of the vehicle to cross each other in the closed position thereof.

7. A device as claimed in claim 4, wherein said flexible elements are connected at their lower end to a lateral extension secured to the lower end of each curved arm.

8. A device as claimed in claim 4, wherein said power means comprise a hydraulic cylinder and piston unit pivotally connected to said pivotable arm and to the vehicle, 9. A holding device as claimed in claim 4, wherein both said curved arms are pivoted on said vehicle.

10. A device as claimed in claim 4, wherein said transverse member is disposed above the central part of said vehicle, and a downwardly and rearwardly inclined apron secured to said vehicle and disposed between said transverse member and the back of said vehicle, the front edge of said apron being substantially level with said transverse member.

11. A device as claimed in claim 10, wherein said curved arms and flexible elements extend through a slot defined by said transverse member at the front edge of said apron.

References Cited in the file of this patent
UNITED STATES PATENTS

| | | |
|---|---|---|
| 948,159 | Brown | Feb. 1, 1910 |
| 2,161,734 | Wheless | June 6, 1939 |